United States Patent [19]
Mangin et al.

[11] Patent Number: 5,982,778
[45] Date of Patent: Nov. 9, 1999

[54] ARRANGEMENT FOR REGULATING PACKET FLOW RATE IN SHARED-MEDIUM, POINT-TO-POINT, AND SWITCHED NETWORKS

[75] Inventors: Jim Mangin, San Ramon; Jayant Kadambi, Milpitas; Mohan Kalkunte, Sunnyvale, all of Calif.

[73] Assignee: Advanced Micro Devices, Inc., Sunnyvale, Calif.

[21] Appl. No.: 08/706,317

[22] Filed: Aug. 30, 1996

[51] Int. Cl.$^6$ ................................................ H04L 12/413
[52] U.S. Cl. .......................................... 370/445; 370/252
[58] Field of Search ..................................... 370/445, 447, 370/446, 448, 468, 465, 466, 467, 470, 252, 253, 230, 231, 232, 234, 235

[56] References Cited

U.S. PATENT DOCUMENTS

| | | | |
|---|---|---|---|
| 4,771,391 | 9/1988 | Blasbalg | 370/253 |
| 4,926,415 | 5/1990 | Tawara et al. | 370/231 |
| 5,319,641 | 6/1994 | Fridrich et al. | |
| 5,353,287 | 10/1994 | Kuddes et al. | |
| 5,404,353 | 4/1995 | Ben-Michael et al. | |
| 5,418,784 | 5/1995 | Ramakrishnan et al. | 370/413 |
| 5,422,887 | 6/1995 | Diepstraten et al. | |
| 5,436,903 | 7/1995 | Yang et al. | |
| 5,526,355 | 6/1996 | Yang et al. | |
| 5,602,829 | 2/1997 | Nie et al. | 370/235 |

FOREIGN PATENT DOCUMENTS 0632621  4/1995  European Pat. Off. .

OTHER PUBLICATIONS

Comer, D.E., et al., "A Rate–Congested Avoidance and Control Scheme for Packet Switched Networks," Proceedings of the International Conference on Distributed Computin Systems, Paris, May 28–Jun. 1, 1990, Conf. 10, May 28, 1990, IEEE, pp. 390–397.

Williamson, C.L., et al., "Loss–Load Curves: Support for Rate–Based Congestion Control in High–Speed Datagram Networks," Proceedings of the Conference on Communications Architectures and Protocols (SIGCOMM), Zurich, Sep. 3–6, 1996, vol. 21, No. 4, Sep. 3, 1991, Association for Computing Machinery, pp. 17–28.

Pouzin, Louis, "Methods, Tools, and Observations on Flow Control in Packet–Switched Data Networks," IEEE Trans. on Communications, vol. 29, No. 4, Apr. 1981, New York, pp. 413–426.

Gerla, M. et al., "Congestion Control in Interconnected LANS," IEEE Network, vol. 2, No. 1, Jan. 2, 1988, New York, pp. 72–76.

AMD, AM79C971 PCnet™—FAST Single–Chip Full Duplex 10/100 mbps Ethernet Controller for PCI Local Bus, Preliminary Data Sheet Pbulication #20550, Rev. B, May 1996.

Internet Message to: stds–802–3–hssg.ieee.org, from Alakd@aol.com, subject "IPG Issues", Aug. 27, 1996.

Internet Message to: Alakd@aol.com, stds–802–3hssg@ieee.org from mart@CS.UCR.edu, subject "IPG Issues", Aug. 27, 1996.

Johnson, "Fast Ethernet: Dawn of a New Network", Prentice–Hall, Inc. (1996), pp. 158–175.

Breyer et al., "Switched and Fast Ethernet: How It Works and How to Use It", Ziff–Davis Press, Emeryville, California (1995), pp. 60–70.

*Primary Examiner*—Chi H. Pham
*Assistant Examiner*—Steven Nguyen

[57] ABSTRACT

Delay times are modified in full-duplex Ethernet network devices by calculating in each network station a delay interval based on a size of a transmitted data packet and a desired transmission rate. The network station waits the calculated delay time before transmitting another data packet, ensuring that the overall output transmission rate of the network station corresponds to the assigned desired transmission rate. The desired transmission rate is received as a media access control (MAC) control frame from a network management entity, such as a switched hub. Hence, each station operates at the desired transmission rate, minimizing the occurrence of congestion and eliminating the necessity of PAUSE frames.

24 Claims, 8 Drawing Sheets

ARRANGEMENT FOR REGULATING PACKET FLOW RATE IN SHARED-MEDIUM, POINT-TO-POINT, AND SWITCHED NETWORKS

TECHNICAL FIELD

The present invention relates to network interfacing and more particularly, to methods and systems controlling network data traffic on media of half-duplex and full-duplex networks.

BACKGROUND ART

Local area networks use a network cable or other media to link stations on the network. Each local area network architecture uses a media access control (MAC) enabling network interface cards at each station to share access to the media.

The Ethernet protocol ISO/IEC 8802-3 (ANSI/IEEE Std. 802.3, 1993 edition) defines a half-duplex media access mechanism that permits all stations to access the network channel with equality. Traffic is not distinguished or prioritized over the medium. Each station includes an Ethernet interface card that uses carrier-sense multiple-access with collision detection (CSMA/CD) to listen for traffic on the media. The absence of network traffic is detected by sensing a deassertion of a receive carrier on the media. A station having data to send will attempt to access the channel by waiting a predetermined time after the deassertion of a receive carrier on the media, known as the interpacket gap (IPG) interval.

A full duplex environment has been proposed for Ethernet networks, referred to as IEEE 802.3x, Full Duplex with Flow Control-Working Draft (0.3). The full duplex environment provides a two-way, point-to-point communication link between two network stations using a switched hub. Hence, two stations can simultaneously transmit and receive Ethernet data packets between each other without collisions.

Network congestion occurs if a receiving station or a switched hub is unable to receive data at the transmission rate of the transmitting station. For example, traffic in a client-server environment is dominated by client requests followed by a burst of frames from the server to the requesting client. Although the full duplex environment enables the server to transmit packets while receiving requests from other clients, only a limited number of client requests can be output from the switched hub to the server. If the number of client requests exceeds the capacity of the hub switching port assigned to the server, some of the data packets will be lost. Alternatively, a client having limited buffer space may be unable to keep up with the transmission rate of the server, resulting in lost packets.

Flow control has been proposed to reduce network congestion, where a sending station temporarily suspends transmission of data packets. A proposed flow control arrangement for a full duplex environment, referred to as IEEE 802.3x[2], specifies generation of a flow control message, for example a PAUSE frame. A transmitting station that receives the PAUSE frame enters a pause state in which no frames are sent on the network for a time interval specified in the PAUSE frame.

Another proposed flow control arrangement for a half duplex environment, referred to as "backpressure", causes a receiving station to force a collision with the transmitting station when the receive buffer of the receiving station reaches a "receive buffer unavailable" state.

The disclosed flow control proposals, however, reduce the effective bandwidth of the network media. For example, if a full-duplex receiving station repeatedly sends PAUSE frames specifying small pause intervals to a transmitting station, the effective bandwidth of the media is reduced due to the transmission of a plurality of 64-byte PAUSE messages instead of data. For example, if a switched hub has a transmit buffer for data to be sent to a station, repeated transmission of PAUSE frames by the switched hub to that station reduces the removal rate of the data from the transmit buffer. Hence, the transmit buffer containing the data for the station may tend to overflow.

Network throughput may also be reduced if the specified pause interval is too long, where the transmitting station may remain in an idle condition after the receiving station has eliminated the congestion.

Data loss may also occur if data packets are sent by the transmitting station after generation of the PAUSE frame by the receiving station. For example, the transmitting station may send a number of data packets before receipt of the PAUSE frame due to propagation delays between the transmitting and receiving stations. The network throughput is further reduced if upper layer protocol requires the last data to be resent.

DISCLOSURE OF THE INVENTION

There is a need for an arrangement that regulates the rate of data transmission by a network station to minimize the necessity of flow control.

There is also a need for an arrangement in a network station that transmits data packets according to a desired transmission rate without the necessity of external monitoring or control.

There is also a need for an arrangement that minimizes congestion throughout a network.

These and other objects are attained by the present invention, where the each network station dynamically adjusts its delay time between transmissions based on a size of the transmitted data.

According to one aspect of the present invention, a method in a network station for transmitting data packets onto network media comprises transmitting a first data packet of identified size onto the media, determining a delay time based on a predetermined desired transmission rate and the identified size of the first data packet, and following the transmitting step, waiting the determined delay time before transmitting a second data packet onto the media. The network station determines the network delay time based on size of each transmitted packet and the predetermined desired transmission rate. Hence, a network station can regulate its rate of transmission to maintain an overall output transmission rate in accordance with the predetermined desired transmission rate.

Another aspect of the present invention provides a network interface for connection with a network media, comprising a transmit buffer for storing a first data packet to be transmitted on the network media, a buffer controller configured to determine a size of the first data packet, and a media access controller for transmitting the first data packet on the network media, the media access controller configured to wait a delay time after the transmission of the first data packet before transmitting a second data packet onto the network media, the delay time corresponding to the first data packet size and a desired transmission rate. The network interface enables the station on a network to be configured to operate at an effective output transmission rate in accordance with the desired transmission rate. Moreover, the desired transmission rate can be received over the network media, enabling the network interface to dynamically adjust its effective output transmission rate in accordance with external network management requirements.

Still another aspect of the present invention provides a method of controlling transmission of data packets by network stations, comprising outputting from a network manager to at least one network station a data packet specifying a corresponding first desired transmission rate, and in the at least one network station, (1) transmitting on a network media a first data packet of identified size, (2) determining a delay time based on the corresponding first desired transmission rate and the identified size of the first data packet, and (3) following the transmitting step, waiting the determined delay time before transmitting a second data packet. The first desired transmission rate output by the network manager ensures that congestion is minimized. In addition, the desired transmission rate may be changed due to changes in the network, for example, adding a new station, increased traffic, etc.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF DRAWINGS

Reference is made to the attached drawings, wherein elements having the same reference numeral designations represent like elements throughout and wherein.

BEST MODE FOR CARRYING OUT THE INVENTION

Figures 1, 1A:
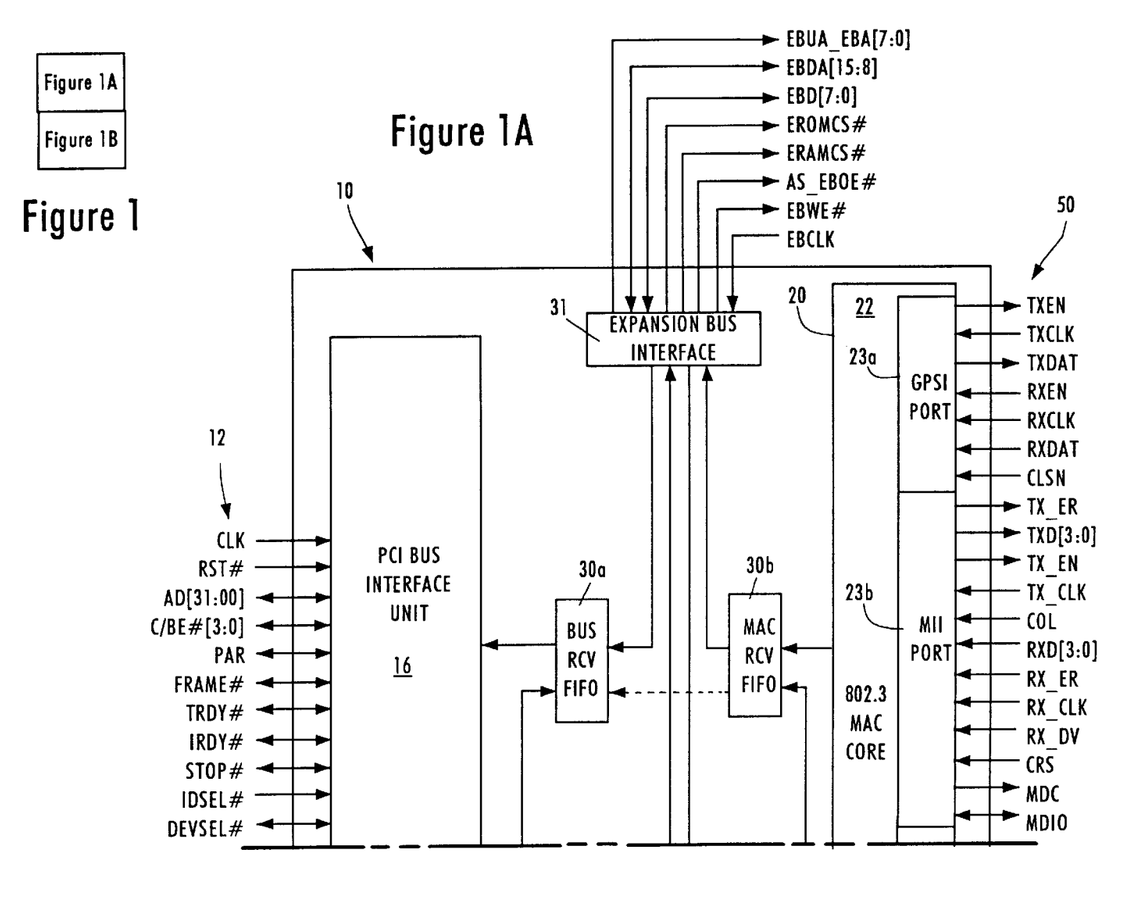
FIG. 1 is a block diagram of a network interface according to an embodiment of the present invention.

FIG. 1 is a block diagram of an exemplary network interface 10 that accesses the media of an Ethernet (ANSI/IEEE 802.3) network according to an embodiment of the present invention.

The network interface 10, preferably a single-chip, 32-bit Ethernet controller, provides an interface between a local bus 12 of a computer, for example, a peripheral component interconnect (PCI) local bus, and an Ethernet-based media 50. An exemplary network interface is the Am79C971 PCnet™-FAST Single-Chip Full-Duplex Ethernet Controller for PCI Local Bus, disclosed in Preliminary Data Sheet Publication #20550, Rev. B, Issue Date May, 1996, from Advanced Micro Devices, Inc., Sunnyvale, Calif., the disclosure of which is incorporated in its entirety by reference.

The interface 10 includes a PCI bus interface unit 16, a direct memory access (DMA) buffer management unit 18, and a network interface portion 20. The network interface portion 20 selectively operates in either half-duplex mode or full-duplex mode according to IEEE 802.3x[2]. The network interface portion 20 includes a media access control (MAC) core 22, a General Purpose Serial Interface (GPSI) 23a, a Media Independent Interface (MII) 23b for connecting external 10 MBit/s or 100 MBit/s transceivers, an External Address Detection Interface (EADI) 23c, an attachment unit interface (AUI) 24, and a twisted-pair transceiver media attachment unit (10BASE-T MAU) 26. The AUI port 24 follows the specification ISO/IEC 8802-3 (IEEE-ANSI 802.3). The interface 10 also includes an EEPROM interface 28, an LED control 29, and an expansion bus interface 31 for boot RAM (e.g., EPROM or Flash memory) during startup, and an IEEE 1149.1-compliant JTAG Boundary Scan test access port interface 36. Full-duplex operation can be performed by any of the AUI, GPSI, 10BASE-T and MII interfaces. Additional details of these interfaces are disclosed in the above-referenced Am79C971 Preliminary Data Sheet.

The network station 10 also includes a PCI bus receive first in first out (FIFO) buffer 30a, a MAC receive FIFO buffer 30b, a PCI bus transmit FIFO buffer 32a, a MAC transmit FIFO buffer 32b, and a FIFO controller 34.

The PCI bus interface unit 16, compliant with the PCI local bus specification (revision 2.1), receives data frames from a host computer's CPU via the PCI bus 12. The PCI bus interface unit 16, under the control of the DMA buffer management unit 18, receives DMA and burst transfers from the CPU via the PCI bus 12. The data frames received from the PCI bus interface unit 16 are passed on a byte-by-byte basis to the PCI bus transmit FIFO buffer 32a, and subsequently to the MAC transmit FIFO buffer 32b.

The buffer management unit 18 manages the reception of the data by the PCI bus interface unit 16 and retrieves information from header bytes that are transmitted at the beginning of transmissions from the CPU via the PCI bus 12. The header information identifying the byte length of the received frame is passed to the FIFO control 34.

The network interface 10 includes a network port manager 38, and an auto-negotiation unit 40. The auto-negotiation unit 40 communicates via the media 50 with a corresponding auto-negotiation unit in the hub serving the network interface 10, described below.

Figure 2:
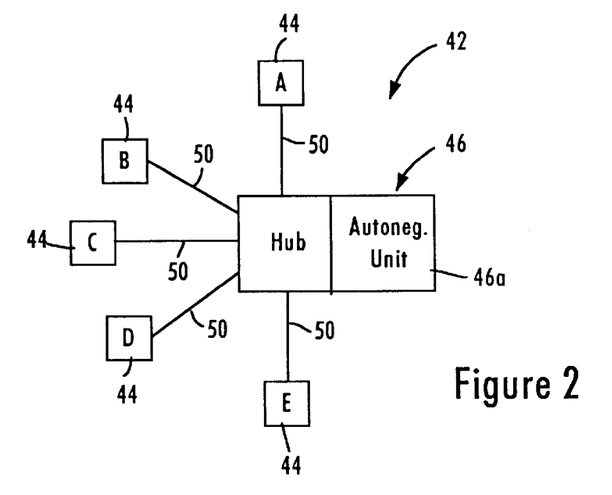
FIG. 2 is a diagram illustrating a network configuration of stations having the network interface of FIG. 1.

FIG. 2 is a diagram illustrating a network 42 connecting five network stations 44 by a network media 50 to a hub 46. The media 50 may be either coaxial, fiber optic, or twisted pair wire, and hence may couple the interface 10 of each corresponding station 44 to 10BASE-T, 10BASE-2, 100BASE-TX, 100BASE-T4, or 100BASE-FX networks. The network 40 may operate at 10 megabits per second (10 Mbit/s), 100 megabits per second (100 Mbit/s) or 1000 megabits per second (1000 Mbit/s).

The hub 46 is implemented as a full-duplex switch that simultaneously sends and receives data packets to each of the stations 44. In addition, the hub 46, also referred to as a network manager, includes an auto-negotiation unit 46a that performs auto-negotiation functions with each of the network stations 44 with respect to physical layer protocol. For example, the auto-negotiation unit 46a includes a link start-up procedure each time a link to a station 44 is connected, powered on or reset. During auto-negotiation, the hub 46 automatically configures each station 44 for operating according to the network configuration parameters, for example, network topology, signaling, distance to hub, and number of stations on the network.

Upon completion of the auto-negotiation process by the hub 42, the network station interface 10 in each station 44 will receive and store network configuration data, described below. Additional details regarding repeaters and auto-negotiation are disclosed in Breyer et al. "Switched and Fast Ethernet: How It Works and How to Use It", Ziff-Davis Press, Emeryville, Calif., (1995), pp. 60–70, and Johnson, "Fast Ethernet: Dawn of a New Network", Prentice-Hall, Inc. (1996), pp. 158–175, the disclosures of which are incorporated in their entirety by reference.

The full-duplex network 42 enables a network station 44 to simultaneously transmit and receive data packets on the corresponding media 50. Hence, CSMA/CD functions are disabled in the full-duplex network 42, such that controllers do not use carrier sense to defer to passing traffic, and do not use collision detect to abort, backoff, or retry transmissions.

An example of full-duplex communication in the network 42 of FIG. 2 involves point-to-point transmission between stations A and B via the hub 46. The hub 46 acts as a switch, enabling stations A and B to each simultaneously transmit and receive data. Alternatively, full duplex operation is also possible in the special case of two stations with no hub.

According to the current IEEE 802.3x Revision 1.0 Full-Duplex Draft, stations 44 and the hub 46 are able to send a MAC control frame. Only one MAC control frame is currently specified by IEEE 802.3x[2], namely the PAUSE frame. The MAC control frame enables communications between the respective MAC controllers 22, for example, handshaking, signaling, etc. Hence, if station B detects an overload condition, the MAC 22 of the station B could output a PAUSE frame to the MAC 22 of station A, requesting the station A to pause for a specified number of slot times. A slot time ($t_s$) is defined as 512 bit times for 10 MBit/s and 100 MBit/s networks. The slot time ($t_s$) has a preferred value of 4096 bit times for 1000 MBits/s networks, although other values may be used consistent with network topology and propagation characteristics.

The disclosed network 42 minimizes the need for PAUSE frames by establishing a negotiated transmission rate, also referred to as a desired transmission rate, between each network station 44 and the hub 46. The hub 46 determines a desired transmission rate ($r_i$) for each network station 44, and outputs the desired transmission rate to the corresponding station as a MAC control frame in accordance with IEEE 802.3x[2] protocol. As described below, the desired transmission rate may be supplied to the corresponding station 44 during powerup, during auto-negotiation, when a new station is added on the network, or when the hub 46 determines that the desired transmission rates should be reallocated for stations requiring more bandwidth.

Figure 3:
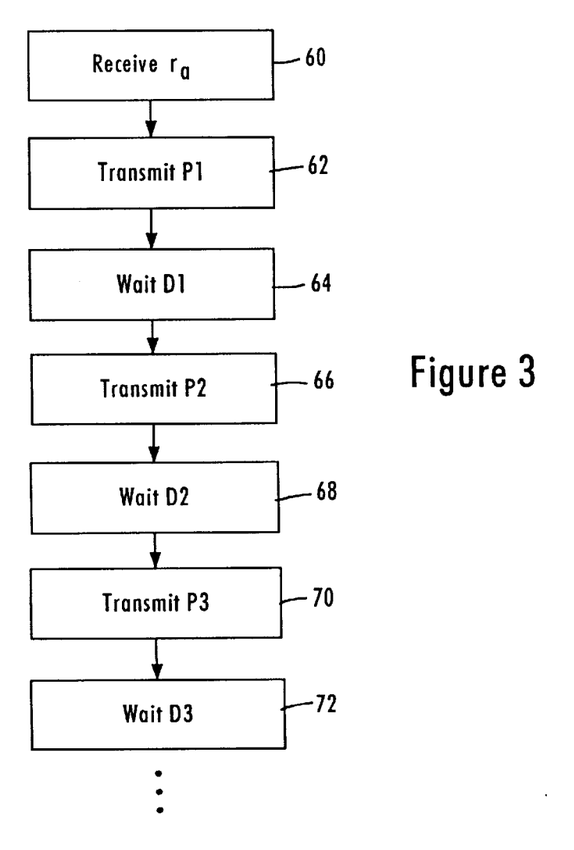
FIG. 3 is a flow diagram summarizing a method in a network station of transmitting data packets according to an embodiment of the present invention.

FIG. 3 is a flow diagram summarizing a method in a network station 44 of transmitting data packets according to an embodiment of the present invention. Each station 44 monitors its corresponding transmission of data by monitoring the size of each transmitted packet (i.e., the number of bytes) to ensure that its effective output transmission rate is in accordance with the desired transmission rate negotiated with the hub 46. For simplicity, the method of FIG. 3 is described with respect to station A.

The method begins in step 60 by station A receiving the desired transmission rate ($r_a$) from the network manager, shown in FIG. 2 as the hub 46. Hence, the stations A, B, C, D, E, receive the respective desired transmission rates $r_a$, $r_b$, $r_c$, $r_d$, $r_e$, respectively. The station A then transmits a first data packet (P1) in step 62 according to full-duplex Ethernet protocol. The station A then calculates a delay time (D1) based upon the desired transmission rate ($r_a$) and the size of the first data packet (P1), described below, and waits in step 64 the determined delay time (D1) before transmitting a second data packet (P2) step 66. As described below, the duration of the delay time is directly proportional to the size of the transmitted data packet. Hence, if the transmitted data packet (P1) has a large size, i.e., a large number of bytes, the delay time (D1) has a longer duration to maintain an overall constant output transmission rate.

After transmitting the second packet (P2) in step 66, each station A will wait for a second delay time (D2) in step 68 based on the size of the second data packet (P2) and the desired transmission rate. After transmission of the third data packet (D3) in step 70, the station will wait a third delay time (D3) in step 72 based upon the size of the third data packet (P3) and the desired transmission rate. Hence, the delay time between transmissions is calculated on a per-packet basis to ensure that the output transmission rate corresponds to the desired transmission rate.

Figure 4A:
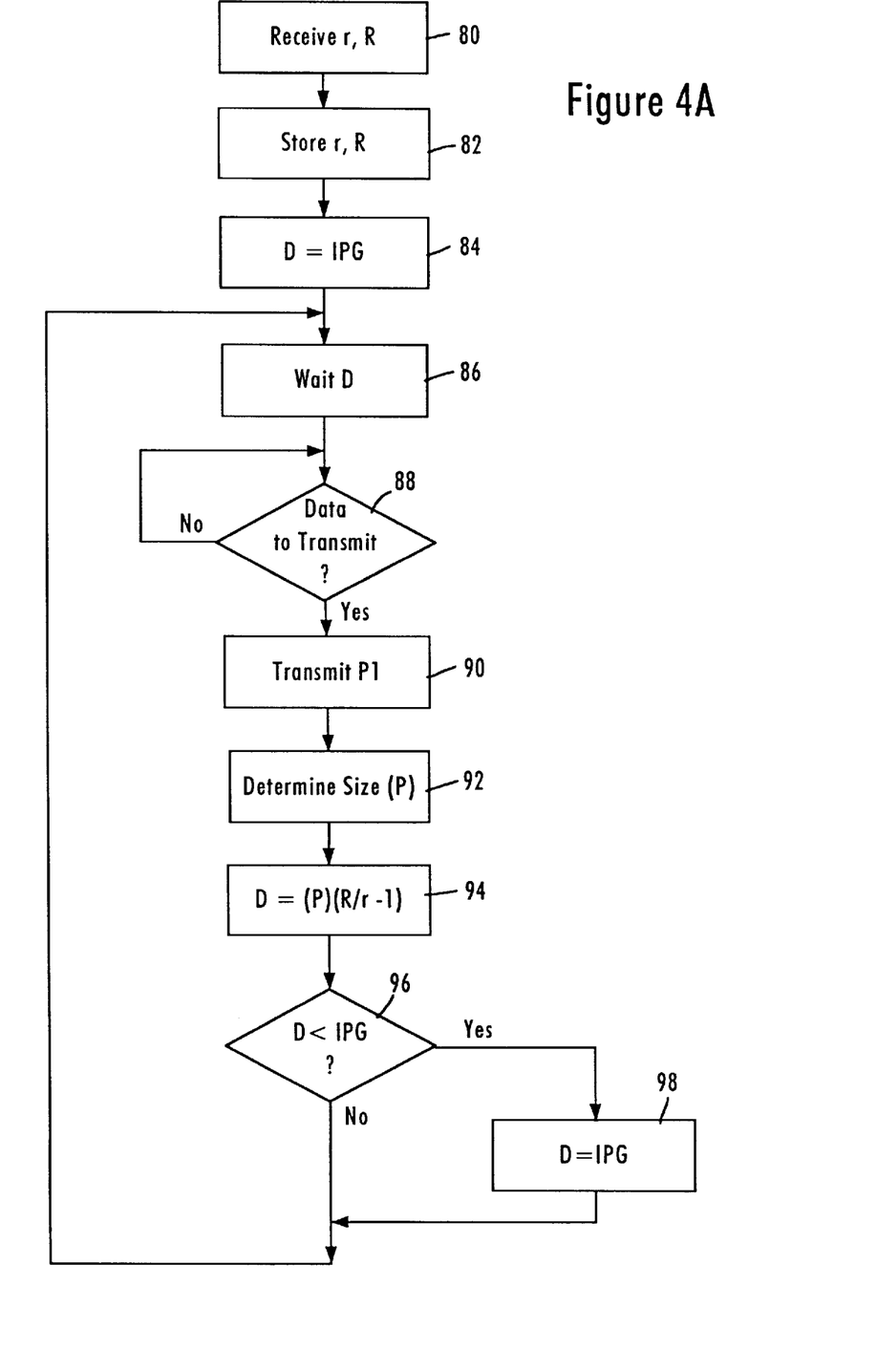
FIGS. 4A and 4B are flow diagrams illustrating alternative methods of calculating the delay times of FIG. 3.
Figure 4B:
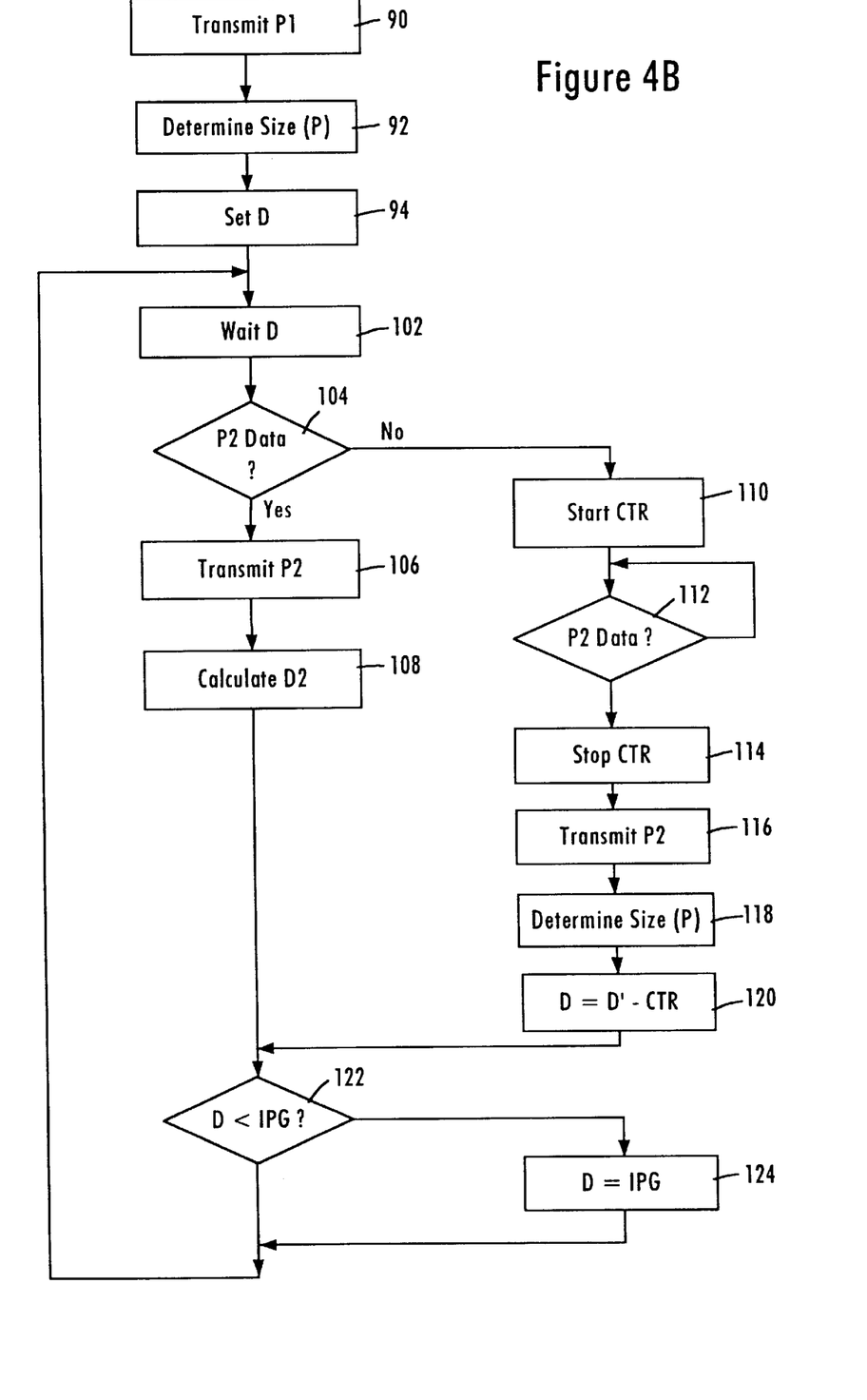

FIGS. 4A and 4B are flow diagrams illustrating alternative methods of calculating the delay times D1, D2 and D3 of FIG. 3. The disclosed methods may be implemented by embedding executable code with a memory element in the MAC 22 (e.g., register, EPROM, EEPROM, Flash Memory). The Media Access Controller (MAC) 22 in the network interface 10 of a station 44 starts in step 80 by receiving MAC control frames from the hub 46 identifying the desired transmission rate (r). The MAC 22 also receives in step 80 the predetermined network transmission rate (R). As described above, the transmission rates r, R may be received by the network interface 10 during auto-negotiation with the hub 46. After storing the desired transmission rate (r) and the predetermined network transmission rate (R) in memory in step 82, the MAC 22 begins the process of accessing the media 50 by setting the delay time equal to the minimum IPG interval of 9.6 microseconds for a 10 Mbit/s network and 0.96 microseconds for a 100 Mbit/s network. A similar IPG interval can be determined for a 1000 Mbit/s network.

After setting the delay time to the minimum IPG in step 84, the MAC 22 starts a delay timer in step 86, which causes the MAC 22 to wait the set delay time (D).

After waiting the delay interval in step 86, the MAC 22 checks in step 88 whether the transmit FIFO buffer 32b has a data packet to send. If the MAC transmit FIFO buffer 32b has no data to send, the MAC 22 remains in a wait state until data is available. The MAC 22 may also be simultaneously receiving data in full-duplex mode. Once the MAC transmit FIFO buffer 32b has data for transmission, the MAC 22 transmits the data packet in step 90, and at the same time determines the size of the packet (p) in step 92.

Figure 7:
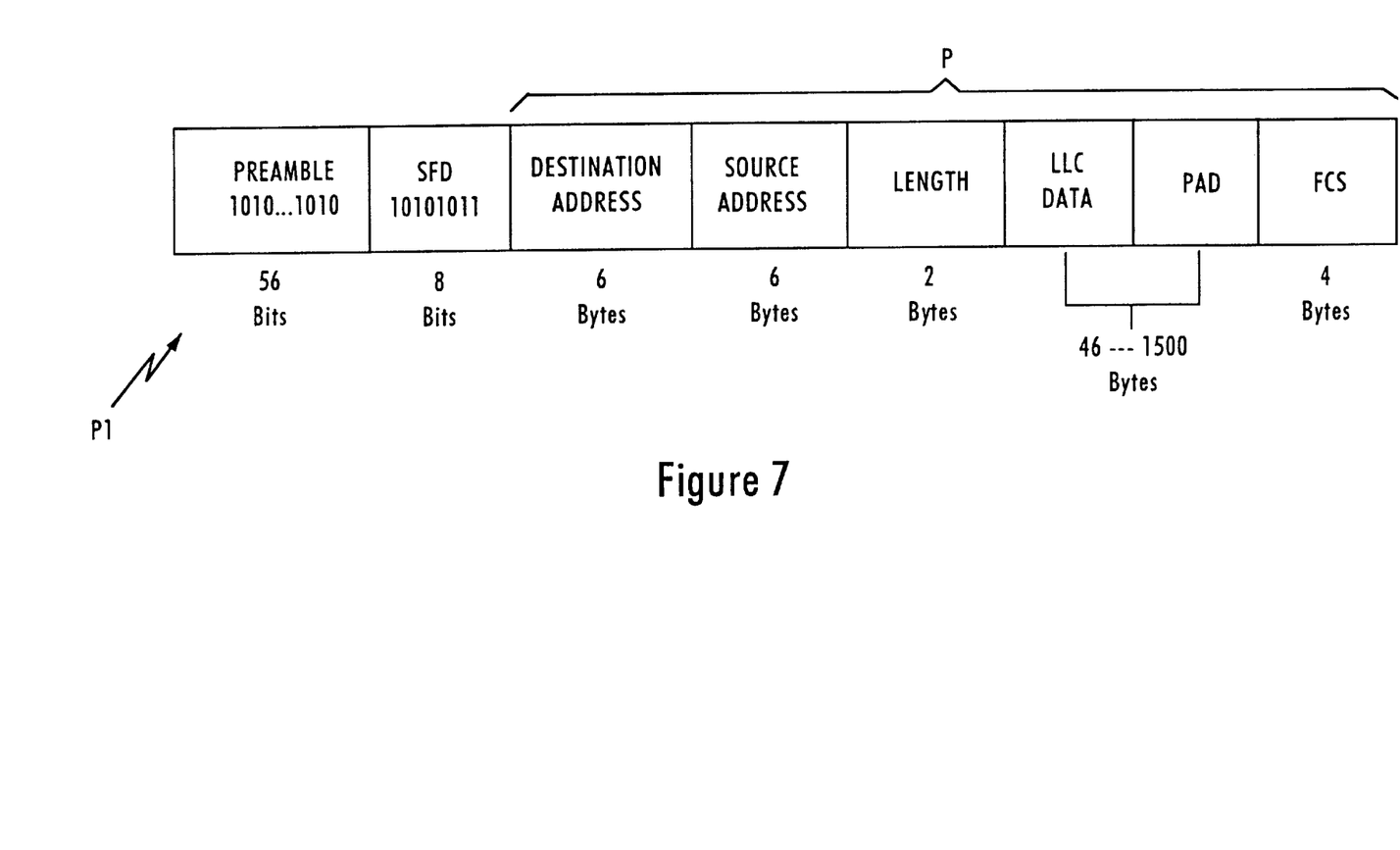
FIG. 7 is a block diagram of a data packet output by the network interface of FIG. 1.

FIG. 7 is a diagram illustrating a data packet output in accordance with ISO 8802-3 (IEEE/ANSI 802.3). As shown in FIG. 7, the size (p) of the data packet is determined by number of bytes in the transmitted packet (P1), exclusive of the preamble and the Start Frame Delimiter (SFD) of the data packet transmitted onto the media 50. Information regarding the size of the data packet (p) is obtained from the an internal MAC counter that counts the number of transmitted bytes. Alternately, the length can be determined based on the length field (Length) of the transmitted data frame.

After determining the size of the transmitted data packet (P1) in step 92, the MAC 22 determines the delay time (D) based upon the size of the transmitted data packet (p), the desired transmission rate (r), and the predetermined network transmission rate (R), according to the following equation:

$$D=(p)(R/r-1) \qquad (1)$$

The value of the delay time (D) is thus directly proportional to the determined length (p) of the transmitted data packet.

Hence, the determined delay time (D) is increased as the size (p) of the transmitted data packet increases in order to maintain an overall output transmission rate corresponding to the desired transmission rate (r). In other words, the network station maintains a constant overall transmission rate (r) by increasing the idle time (D) to compensate for the transmission of a larger data packet (p) at the network rate (R). Hence, a primary portion of the delay time (D) is calculated by correlating the size (p) with the coefficient (R/r); that primary portion pR/r is then subtracted by the size to obtain the delay time.

After calculating the delay time (D) in step 94, the MAC 22 checks in step 96 if the determined delay time (D) equals at least the minimum IPG. If the MAC 22 determines in step 96 that the calculated delay (D) is less than the minimum IPG, the delay time (D) is reset in step 98 to equal the minimum IPG.

Once the delay time has been calculated based upon the determined size of the last transmitted data packet in step 90, the MAC 22 waits the determined delay time in step 86 before transmitting another data packet onto the media.

FIG. 4B is a flow diagram illustrating another method of calculating the delay time of FIG. 3. The method of FIG. 4B uses an idle counter to reduce the delay time in the event that the MAC 22 does not have data available for transmission.

As shown in FIG. 4B, the MAC 22 transmits a data packet (P1) in step 90, determines the size of the transmitted data packet in step 92, and calculates the first delay (D) in step 94, as described with respect to FIG. 4A above. The MAC 22 then waits the determined delay time (D) in step 102 before transmitting a second data packet (P2) onto the media. After waiting the determined delay time (D), the MAC 22 checks in step 104 whether the MAC transmit FIFO buffer 32b has data for transmission. If the MAC 22 determines that data is available for transmission (P2), the MAC 22 transmits the data packet (P2) in step 106, and calculates the delay time (D) in step 108 as described above with respect to step 94.

If in step 104 the MAC 22 determines that the MAC transmit FIFO buffer 32b does not immediately have data available for transmission, the MAC 22 starts an idle counter in step 110, and continues counting the idle counter in step 112 until the MAC 22 detects the presence of data in the MAC transmit FIFO buffer 32b. Once the MAC 22 detects the presence of data for transmission, the MAC 22 stops the idle counter (CTR) in step 114, and begins transmission of the data in step 116.

The MAC 22 then determines the size of the transmitted data packet (P2) in step 118, and calculates the delay time in step 120 based upon the size of the transmitted data packet, the desired transmission rate, and the idle time interval counted by the idle counter. Specifically, the MAC 22 calculates in step 120 a primary delay interval (D') using equation (1) described above with respect to step 94. Hence, the primary delay interval (D') is directly proportional to the product of the size of the transmitted data packet and the ratio of the predetermined network transmission rate and the desired rate. The MAC 22 subtracts the idle time interval (CTR) from the primary delay interval (D') to obtain the delay time:

$$D=D'-CTR \qquad (3)$$

After calculating the delay interval in step 120, the MAC 22 checks in step 122 to verify the calculated delay time (D) is not less than the minimum IPG value. If the calculated delay time (D) is less than the minimum IPG value, the MAC 22 sets the delay (D) in step 124 to the minimum IPG, and returns to step 102 to wait the delay time (D) before transmitting another data packet onto the media 50.

Figure 5:
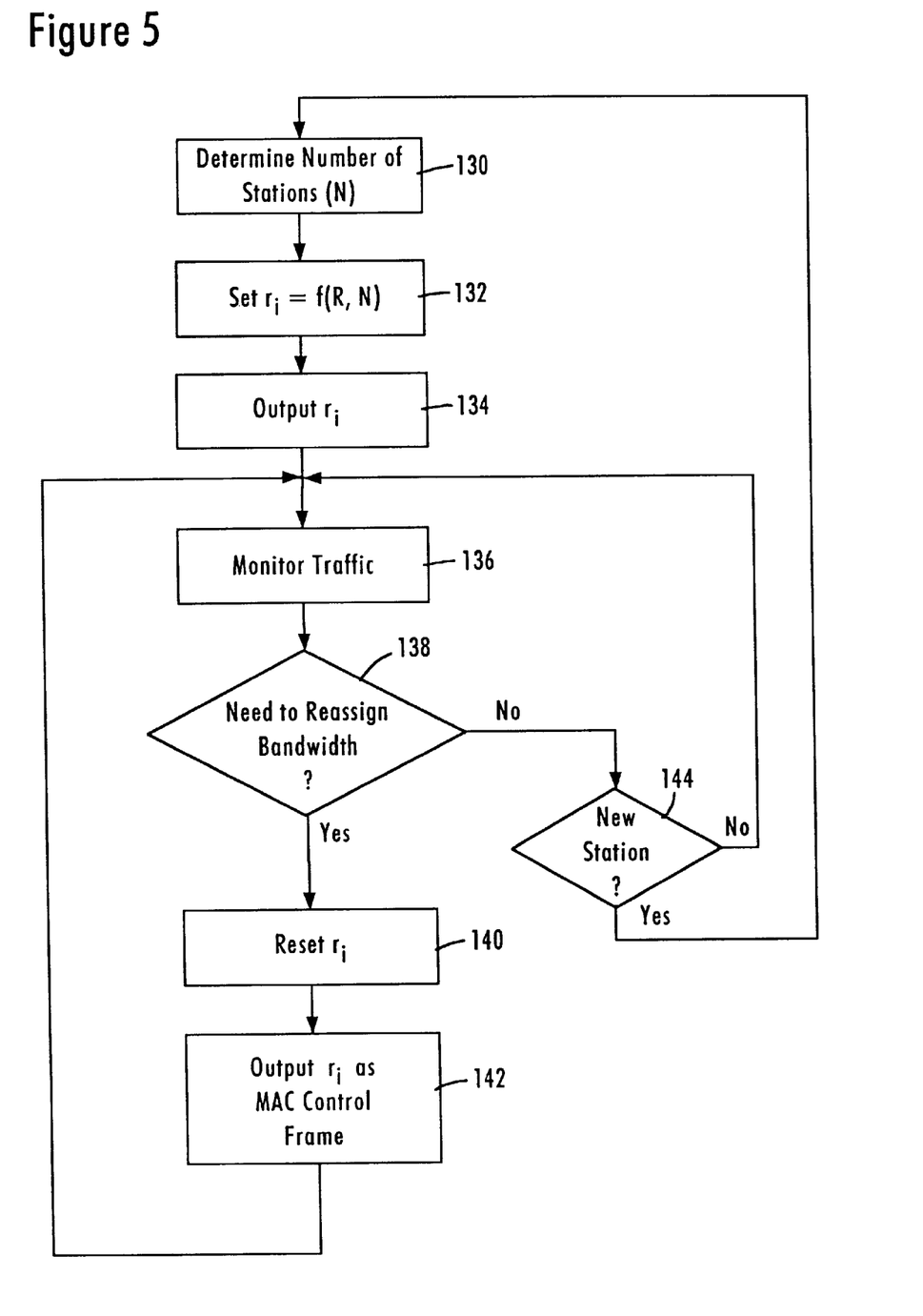
FIG. 5 is a flow diagram illustrating a method of controlling transmission of data packets by network stations according to an embodiment of the present invention.

FIG. 5 is a flow diagram illustrating a method of controlling transmission of data packets according to an embodiment of the present invention. The method of FIG. 5 is implemented in the hub 46, where the auto-negotiation unit 46a monitors the traffic of the network stations 40, and resets the desired network transmission rates if necessary, for example if a new station becomes active on the network.

As shown in FIG. 5, the hub 46 begins by determining in step 130 the number of stations (N) on the network. After determining the number of stations, the hub 46 then sets in step 132 each of the desired transmission rates ($r_i$) as a function of the network transmission rate (R) and the number of stations ($r_i=f(R,N)$).

After setting the desired transmission rate in step 132, the hub 46 outputs in step 134 a MAC control frame identifying the desired transmission rate ($r_i$) to each network station 44, and begins monitoring traffic in step 136. For example, the hub 46 may maintain statistical data to measure the level of activity by each of the network stations to determine which stations are the most active, or which stations send the largest data packets. The hub 46 then determines in step 138 whether bandwidth needs to be reassigned by changing the desired transmission rates of the stations. If the hub 46 determines that bandwidth does not need to be reassigned, then the hub 46 checks in step 144 if a new station is added to the network. If no new station is added, the hub 46 continues to monitor traffic in step 136. However, if a new station is added in step 144, the hub 46 recalculates the desired transmission rate based upon the new number of stations.

If in step 138 the hub 46 determines that bandwidth needs to be reassigned based upon the detected transmission of data packets from the network stations, the hub 46 resets the desired transmission rates ($r_i$) in step 140. For example, assuming the network transmission rate is R=100 Mbit/s, and stations A, B, C, and D are transmitting data to station E operating as a gateway device, the desired transmission rate set in step 132 would be 24 Mbit/s for stations A, B, C, D to transmit to station E of FIG. 2, and 4 Mbit/s for station E to send acknowledgement packets. Assuming that the hub 46 determined in step 136 that station A no longer transmits packets, the hub 46 could reset the desired transmission rates to $r_a$=5 Mbit/s, $r_b$=30 Mbit/s, $r_c$=30 Mbit/s, $r_d$=30 Mbit/s, and $r_e$=5 Mbit/s. Hence, the hub 46 may dynamically reassign the bandwidth, as needed.

After reassigning the desired transmission rate for each of the stations in step 140, the hub 46 outputs the new desired transmission rates as MAC control frames in step 142 to the respective stations, and returns to monitoring network activity.

Figure 6:
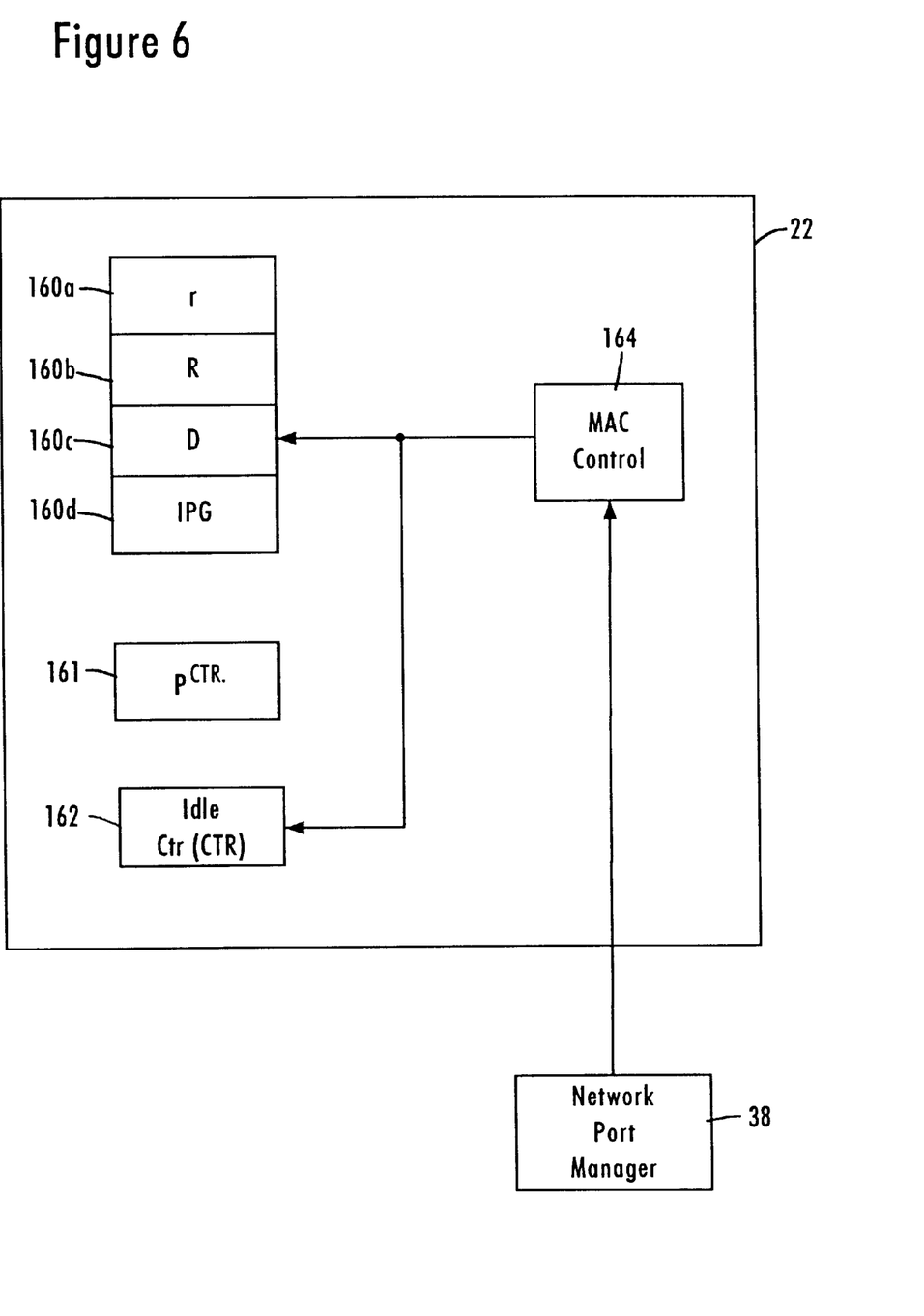
FIG. 6 is a block diagram of the media access control (MAC) of FIG. 1.

FIG. 6 is a block diagram of the media access control 22 of FIG. 1. The MAC 22 of FIG. 6 includes memory elements 160a–d storing the desired transmission rate (r), the network transmission rate (R), the determined delay time (D), and the predetermined IPG corresponding to the network transmission rate, respectively. The MAC 22 also includes a packet size (p) counter 161 for determining a size of a transmitted data packet, and an idle counter 162 for determining an idle time interval between the end of a waiting step and the beginning of the second transmitting step. The p counter 161 determines the size of transmitted packets by counting the number of bytes transmitted at the beginning of transmission, and continues counting until the end of transmission of the data packet. The MAC 22 also includes a MAC controller 164 that calculates the delay time (D), and stores the network configuration data r, R, and IPG received from the network port manager 38.

According to the present invention, a delay time is calculated based on a packet size to maintain a desired transmission rate. Setting the desired transmission rate to correspond to a maximum reception rate at a receiving station enables full-duplex operations without the necessity of PAUSE frames. Hence, the throughput of the full-duplex network can be maximized without the occurrence of congestion.

Although the disclosed embodiment is described with respect to a plurality of stations connected to a switched hub, the present invention is applicable to a network consisting of two stations communicating in full-duplex mode.

In addition, any of the network stations may be reset to use the minimum IPG by resetting the desired transmission rate to correspond substantially to the network transmission rate.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

We claim:

1. A method in a network station for transmitting data packets onto network media, comprising:

transmitting a first data packet of identified size onto the media;

determining a delay time based on a predetermined desired transmission rate and the identified size of the first data packet; and following the transmitting step, waiting the determined delay time before transmitting a second data packet onto the media;

transmitting the second data packet after the waiting step, the second data packet being of a second size;

determining an idle time interval between an end of the waiting step and the beginning of said second transmitting step;

determining a second delay time based on the predetermined desired transmission rate, the second size, and the idle time interval; and following the second data packet transmitting step, waiting the second delay time before transmitting a third data packet onto the media.

2. The method of claim 1, wherein the determining step comprises setting the delay time to at least a predetermined interpacket gap interval in accordance with a predetermined network transmission rate.

3. The method of claim 2, wherein the determining step further comprises calculating a primary portion of the delay time by correlating the identified size of the first data packet with a coefficient corresponding to the desired transmission rate and the predetermined network transmission rate.

4. The method of claim 3, wherein the delay time is directly proportional to the identified size of the first data packet.

5. The method of claim 3, further comprising calculating said coefficient based on a ratio of the predetermined network transmission rate and the desired transmission rate.

6. The method of claim 1, further comprising counting the number of bytes transmitted during said transmitting step to determine the identified size.

7. The method of claim 1, further comprising:

transmitting the second data packet after the waiting step, the second data packet of a second size;

determining a second delay time based on the predetermined desired transmission rate and the second size; and following the second data packet transmitting step, waiting the second delay time before transmitting a third data packet onto the media.

8. The method of claim 7, wherein the determining steps each comprise:

calculating a coefficient based on a ratio of a predetermined network transmission rate and the desired transmission rate; and setting the corresponding delay time directly proportional to a product of the calculated coefficient and the corresponding data packet size.

9. The method of claim 1, wherein the second determining step comprises:

setting a primary delay interval directly proportional to the product of the second size and a ratio of a predetermined network transmission rate and the desired transmission rate; and subtracting the idle time interval from the primary delay interval to obtain the second delay time.

10. The method of claim 1, wherein the transmitting step includes transmitting the first data packet according to IEEE 802.3 fill-duplex protocol.

11. A method in a network station for transmitting data packets onto network media, comprising:

transmitting a first data packet of identified size onto the media;

determining a delay time based on a predetermined desired transmission rate and the identified size of the first data packet;

following the transmitting step, waiting the determined delay time before transmitting a second data packet onto the media;

receiving the desired transmission rate from a network manager; and storing the received desired transmission rate in memory.

12. The method of claim 11, further comprising receiving a data packet from the media simultaneously with said transmitting step.

13. A network interface for connection with a network media, comprising:

a transmit buffer for storing a first data packet to be transmitted on the network media;

a buffer controller configured to determined a size of the first data packet;

a media access controller for transmitting the first data packet on the network media, the media access controller configured to wait a delay time after the transmission of the first data packet before transmitting a second data packet onto the network media, the delay time corresponding to the first data packet size and a predetermined desired transmission rate;

wherein the media access controller comprises:
(1) a first memory portion for storing the desired transmission rate; and
(2) a second memory portion for storing a predetermined network transmission rate of the network media, the media access controller configured to wait said delay time based on the ratio of the predetermined network transmission rate relative to the predetermined desired transmission rate; and further comprising an idle time counter for counting an idle time interval between the lapse of said delay time and the transmission of said second data packet, the media access controller configured to wait a second delay time after the end of transmission of the second data packet before transmission a third data packet, the second delay time based on the second data packet size, said ratio, and the idle time interval.

14. The interface of claim 13, further comprising a network port manager obtaining the predetermined desired transmission rate from the network media.

15. The network interface of claim 13, wherein the media access controller transmits the first data packet onto the network media according to IEEE 802.3 full-duplex protocol.

16. A method of controlling transmission of data packets by network stations, comprising:

outputting from a network manager to at least one network station a data packet specifying a corresponding first desired transmission rate; and in the at least one network station:
(1) transmitting on a network media a first data packet of identified size,
(2) determining a delay time based on the corresponding first desired transmission rate and the identified size of the first data packet, and
(3) following the transmitting step, waiting the determined delay time before transmitting a second data packet.

17. The method of claim 16, the outputting step comprising sending a MAC control frame as said data packet to the at least one network station including the first desired transmission rate.

18. The method of claim 17, wherein the at least one network station has a memory, the method further comprising storing the first desired transmission rate in the memory.

19. The method of claim 18, further comprising:
sending a second MAC control frame specifying a second desired transmission rate from the network manager to the at least one network station; and in the at least one network station:
(4) transmitting a second data packet of a identified size,
(5) determining a new delay time based on the second desired transmission rate and the identified size of the second transmitted data packet, and
(6) following the second data packet transmitting step, waiting the new delay time before transmitting a third data packet.

20. The method of claim 16, further comprising outputting from the network manager to the at least one network station a second corresponding desired transmission rate after the first desired transmission rate, the at least one network station in response determining delay times based on the corresponding second desired transmission rate.

21. The method of claim 20, wherein the step of outputting the second desired transmission rate comprises:
detecting a new station on the network; and
calculating the second desired transmission rate in accordance with the detected new station and a predetermined network transmission rate.

22. The method of claim 20, wherein the step of outputting the second desired transmission rate comprises determining the second desired transmission rate in accordance with detected transmission of data packets from said at least one network station.

23. The method of claim 16, wherein the outputting step comprises:
determining a number of the network stations; and
determining the first desired transmission rate based on the number of network stations and a predetermined network transmission rate.

24. The method of claim 16, wherein the transmitting step includes transmitting the first data packet according to IEEE 802.3 full-duplex protocol.

* * * * *

UNITED STATES PATENT AND TRADEMARK OFFICE
CERTIFICATE OF CORRECTION

PATENT NO. : 5,982,778
DATED : Nov. 9, 1999
INVENTOR(S) : Mangin et al.

Figure 1B:
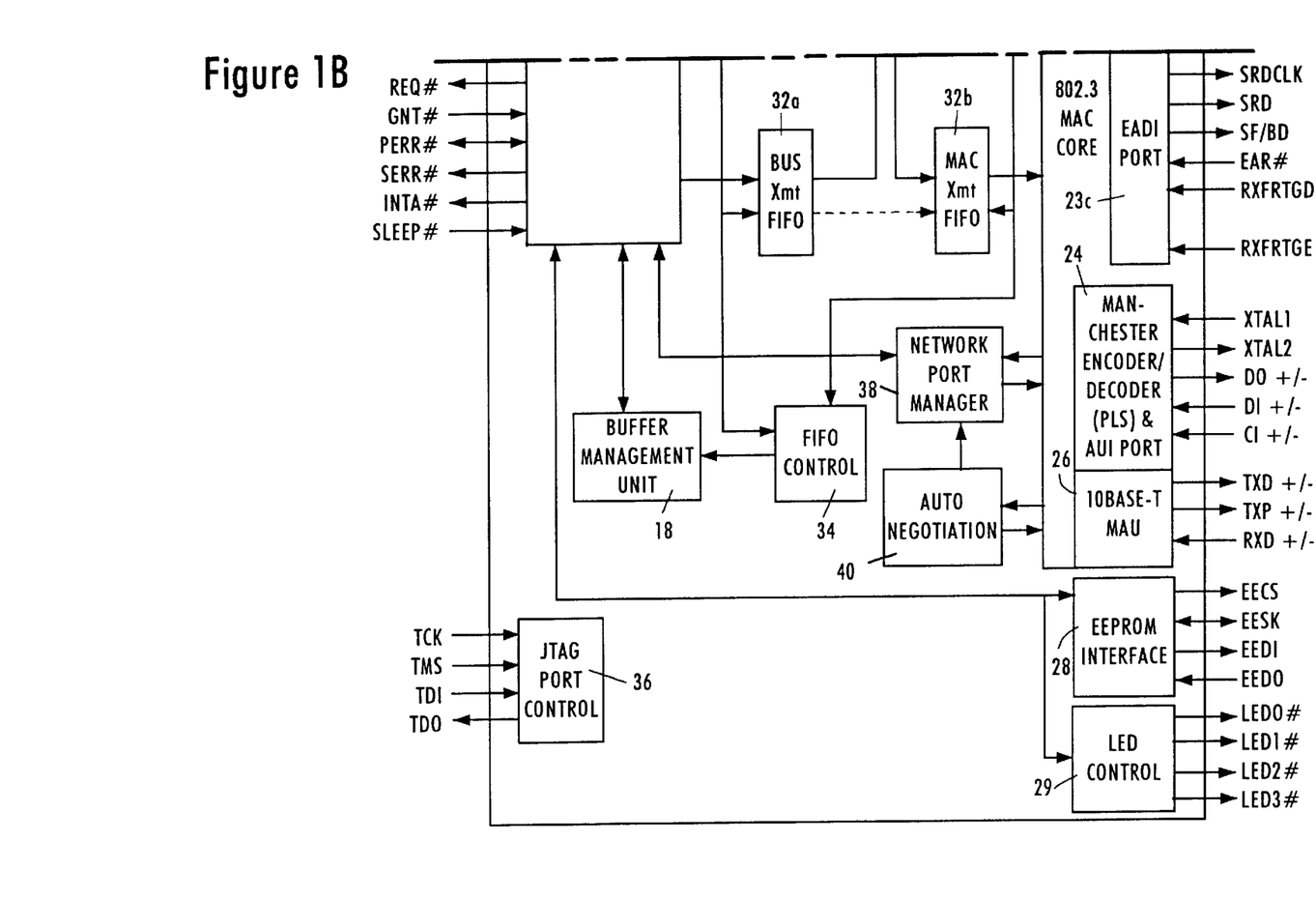

It is certified that error appears in the above-identified patent and that said Letters Patent is hereby corrected as shown below:

Column 3, line 36, change "Figure 1 is a block diagram" to -- Figures 1, 1A and 1B are block diagrams--. Additionally, in the Claims, in Claim 10, line 3, change "fill-duplex" to --full-duplex--.

Signed and Sealed this

Fourth Day of July, 2000

*Attest:*

Q. TODD DICKINSON

*Attesting Officer*   *Director of Patents and Trademarks*